(12) United States Patent
Watson et al.

(10) Patent No.: US 8,203,546 B2
(45) Date of Patent: Jun. 19, 2012

(54) ELECTRONIC DOCUMENT READING DEVICES

(75) Inventors: Ben Watson, London (GB); Nick Sandham, London (GB); David Fisher, London (GB); Duncan Barclay, Cambridge (GB); Simon Jones, Cambridge (GB); Carl Hayton, Cambridge (GB); Anusha Nirmalananthan, Cambridge (GB)

(73) Assignee: Plastic Logic Limited, Cambridge, Cambridgeshire (GB)

( * ) Notice: Subject to any disclaimer, the term of this patent is extended or adjusted under 35 U.S.C. 154(b) by 1052 days.

(21) Appl. No.: 12/027,181

(22) Filed: Feb. 6, 2008

(65) Prior Publication Data

US 2008/0297496 A1 Dec. 4, 2008

(30) Foreign Application Priority Data

Feb. 7, 2007 (GB) .................................. 0702347.6

(51) Int. Cl.
 *G06F 3/038* (2006.01)
 *G06F 3/041* (2006.01)
(52) U.S. Cl. ......... 345/204; 345/173; 345/901; 434/317
(58) Field of Classification Search .................. 345/204, 345/173, 901, 205–206; 434/317; 361/679.26, 361/679.55, 679.56
See application file for complete search history.

(56) References Cited

U.S. PATENT DOCUMENTS

| | | | |
|---|---|---|---|
| 4,453,200 A | 6/1984 | Treka et al. | |
| 4,856,088 A | 8/1989 | Oliwa et al. | |
| 5,347,630 A | 9/1994 | Ishizawa et al. | |
| 5,511,661 A * | 4/1996 | Karlis et al. | 206/338 |
| 5,857,157 A | 1/1999 | Shindo | |
| 5,956,034 A | 9/1999 | Sachs et al. | |
| 6,297,945 B1 | 10/2001 | Yamamoto | |
| 6,388,877 B1 | 5/2002 | Canova, Jr. et al. | |
| 6,456,732 B1 | 9/2002 | Kimbell et al. | |
| 6,661,920 B1 | 12/2003 | Skinner | |
| 6,771,232 B2 * | 8/2004 | Fujieda et al. | 345/30 |
| 6,774,884 B2 * | 8/2004 | Shimoda et al. | 345/107 |
| 6,831,662 B1 | 12/2004 | Lum et al. | |
| 6,839,046 B1 * | 1/2005 | Orisaka et al. | 345/98 |
| 6,888,643 B1 | 5/2005 | Grimes | |

(Continued)

FOREIGN PATENT DOCUMENTS

EP 0 283 235 5/1987

(Continued)

OTHER PUBLICATIONS www.palm.com, Palm Z22, T/X, and Tungsten E2 handhelds (copyright 2005).

(Continued)

*Primary Examiner* — Lun-Yi Lao
*Assistant Examiner* — Jarurat Suteerawongsa
(74) *Attorney, Agent, or Firm* — Fish & Richardson P.C.

(57) ABSTRACT

This invention generally relates to an electronic document reading device, that is to a device such as an electronic book which presents a document to a user on a display to enable the user to read the document. A portable flex-tolerant electronic document reading device, the device including a flex-tolerant display coupled to a flex-tolerant layer of pixel driver circuitry, and wherein said device has a physical configuration comprising a planar display surface and a rear surface having a frame around its outer perimeter to stiffen the device, the frame defining a central region of relatively reduced thickness compared with a thickness of said frame.

18 Claims, 6 Drawing Sheets

U.S. PATENT DOCUMENTS

| | | | |
|---|---|---|---|
| 6,919,879 | B2 | 7/2005 | Griffin et al. |
| 6,943,773 | B2 * | 9/2005 | Wong et al. .................. 345/156 |
| 6,961,029 | B1 | 11/2005 | Canova, Jr. et al. |
| 7,058,829 | B2 | 6/2006 | Hamilton |
| 7,079,111 | B2 | 7/2006 | Ho |
| 7,289,084 | B2 | 10/2007 | Lesniak |
| 2002/0018027 | A1 | 2/2002 | Sugimoto |
| 2002/0102866 | A1 | 8/2002 | Lubowicki |
| 2004/0008398 | A1 | 1/2004 | Amundson |
| 2004/0212582 | A1 * | 10/2004 | Thielemans et al. .......... 345/107 |
| 2004/0263443 | A1 * | 12/2004 | Shirasaki ....................... 345/76 |
| 2004/0268004 | A1 | 12/2004 | Oakley |
| 2005/0025387 | A1 | 2/2005 | Luo |
| 2005/0206580 | A1 | 9/2005 | Koyama et al. |
| 2005/0237444 | A1 | 10/2005 | You |
| 2005/0257143 | A1 | 11/2005 | Lewis |
| 2006/0026536 | A1 | 2/2006 | Hotelling et al. |
| 2006/0274549 | A1 | 12/2006 | Fukuyoshi |
| 2007/0024603 | A1 | 2/2007 | Li |
| 2007/0028086 | A1 | 2/2007 | Oshima et al. |
| 2007/0058178 | A1 | 3/2007 | Kurihara et al. |
| 2007/0115258 | A1 | 5/2007 | Cupps et al. |
| 2007/0195009 | A1 | 8/2007 | Yamamoto et al. |
| 2008/0297470 | A1 | 12/2008 | Marsh et al. |
| 2008/0298083 | A1 | 12/2008 | Watson et al. |
| 2009/0109185 | A1 | 4/2009 | Barclay et al. |
| 2009/0109468 | A1 | 4/2009 | Barclay et al. |
| 2009/0109498 | A1 | 4/2009 | Barclay et al. |
| 2009/0113291 | A1 | 4/2009 | Barclay et al. |
| 2009/0219271 | A1 | 9/2009 | Bandel et al. |

FOREIGN PATENT DOCUMENTS

| | | |
|---|---|---|
| EP | 1 308 825 | 5/2003 |
| GB | 2 214 342 | 8/1989 |
| GB | 2 446 500 | 8/2008 |
| GB | 2 454 032 | 4/2009 |
| GB | 2 454 033 | 4/2009 |
| JP | 10-027162 | 1/1998 |
| JP | 2005266968 | 9/2005 |
| JP | 2005274832 | 10/2005 |
| WO | 02/095555 | 11/2002 |
| WO | 03/017245 | 2/2003 |
| WO | 03/044765 | 5/2003 |
| WO | 2004/114259 | 12/2004 |
| WO | 2006/031347 | 3/2006 |
| WO | 2009/053738 | 4/2009 |
| WO | 2009/053740 | 4/2009 |
| WO | 2009/053743 | 4/2009 |
| WO | 2009/053747 | 4/2009 |

OTHER PUBLICATIONS www.palm.com; Palm Z22,T1 and Tungsten E2 handhelds.
International Search Report; GB0801998.6; D. Maskery; May 28, 2008.
Search Report; GB 0802011.7; R. Jenkins; Jun. 18, 2008.
Iddo Genuth: "the Future of Electronic Paper" [Online]; Oct. 15, 2007, XP002513292; http://thefutureofthings.com/articles/1000/the-future-of-electronic-paper.html.
International Search Report; PCT/GB2008/050980; Feb. 23, 2009; E. Maciu.
International Search Report; GB 0802816.9; J. McCann; May 23, 2008.
International Search Report; PCT/GB2008/050977; Feb. 19, 2009; E. Maciu.
International Search Report; GB 0802818.5; J. McCann; May 29, 2008.
Search Report; GB0802820.1; R. Jenkins; Sep. 12, 2008.
International Search Report; PCT/GB2008/050975; Feb. 20, 2009; E. Maciu.
Search Report; PCT/GB2008/050985 (Feb. 23, 2009.
USPTO Office Action in U.S. Appl. No. 12/027,176, mailed Jun. 4, 2009, 12 pages.
Search Report; GB 0801987.9; D. Maskery; May 19, 2008.
Search Report and Examiner Letter for Application No. GB0802011.7 (dated Aug. 27, 2009).

* cited by examiner

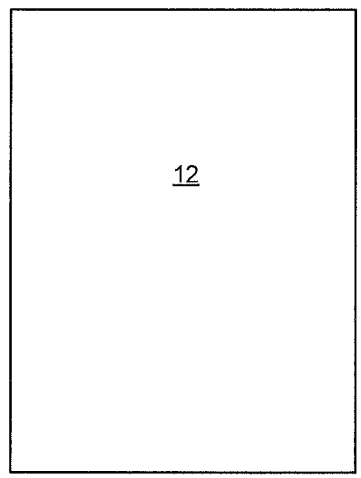
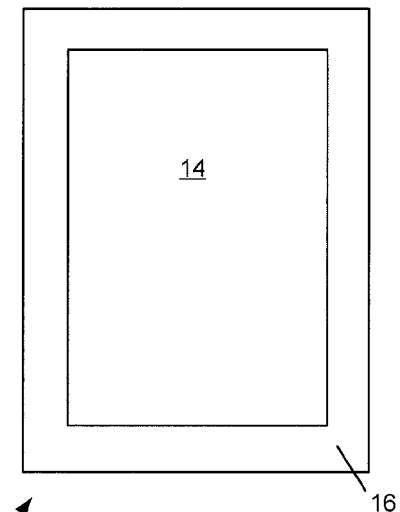
Figure 1a          Figure 1b
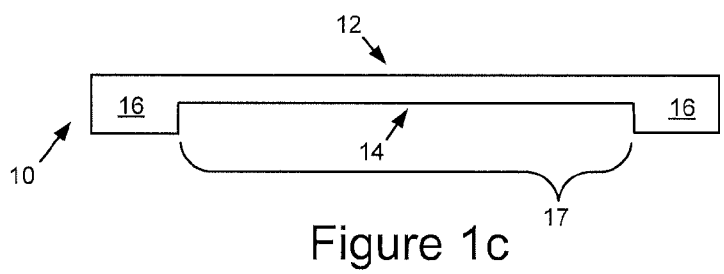
Figure 1c
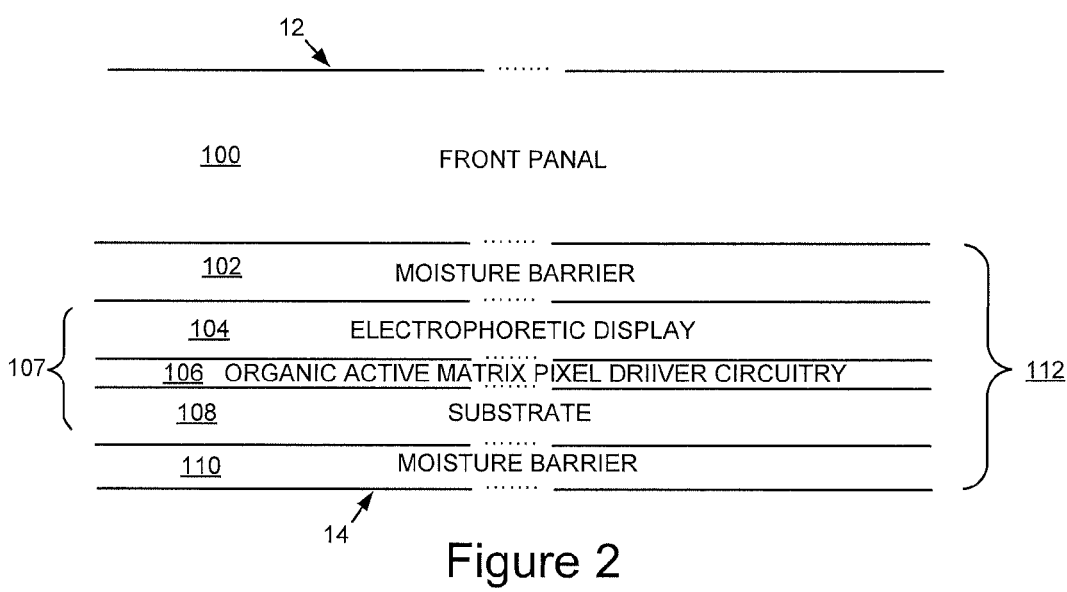
Figure 2

ELECTRONIC DOCUMENT READING DEVICES

CROSS-REFERENCE TO RELATED APPLICATIONS

This application claims the benefit of United Kingdom Patent Application No. 0702347.6, filed Feb. 7, 2007, which is incorporated in its entirety by reference herein.

BACKGROUND OF THE INVENTION

1. Field of the Invention

This invention generally relates to an electronic document reading device, that is to a device such as an electronic book which presents a document to a user on a display to enable the user to read the document.

2. Description of the Related Art

We have previously described a form of electronic book in our earlier application PCT/GB2006/050235, hereby incorporated by reference.

Background prior art relating to electronic document reading devices can be found in U.S. Pat. No. 6,124,851, US2004/0201633, US2006/0133664, US2006/0125802, US2006/0139308, US2006/0077190, US2005/0260551, U.S. Pat. No. 6,124,851, U.S. Pat. No. 6,021,306, US2005/0151742, and US2006/0119615.

There is, however, a desire for improved electronic reading devices.

SUMMARY OF THE INVENTION

According to a first aspect of the invention there is therefore provided a portable electronic document reading device, the device comprising a display coupled to a layer of pixel driver circuitry, and wherein said device has a physical configuration comprising a planar display surface and a rear surface having a frame around its outer perimeter to stiffen the device, the frame defining a central region of relatively reduced thickness compared with a thickness of said frame.

In embodiments the "picture-frame" configuration provides an advantageous combination of a degree of flexibility with stiffness. In embodiments the aim is to provide a display which is robust by virtue of being flex-tolerant. For example embodiments of the device we describe are able to withstand a significant degree of flexion, for example, up to 20-30 degrees over the area of the device, giving the reader a substantial degree of actual and perceived robustness. For example, embodiments of a reader of the type we describe may be sat upon without damage. The device is preferably at least A5 size, more preferably approximately or at least US letter or A4 size (in embodiment an active display area of 220 mm×169 mm with a border of 5, 10, 20 or 25 mm).

One advantage of a picture-frame configuration is that the great majority of the area of the display can be very thin, for example less than 3 mm, more preferably less than 2 mm, most preferably less than 1 mm, so that it experiences a reduced compression/expansion when flexed, the perimeter frame providing stiffness. In some preferred embodiments the display has a flexible, for example plastic, substrate and in particular may comprise a reflective bistable display (for example an electrophoretic, LCD or other like display). Similarly, the pixel driver circuitry preferably also has a flexible, for example plastic, substrate (which may be shared with the display) and in particular preferably comprises active organic electronic devices fabricated by a solution deposition process. However in embodiments the control electronics is formed from conventional silicon devices, which are rigid. Thus in preferred embodiments the control electronics is located in one or more circuit boards at least partially within the frame. The rigid components may be joined to the flexible display and pixel driver circuitry by one or more flexible connectors (preferred embodiments of which are described later). In some particularly preferred embodiments the control electronics together with an internal (rechargeable) power supply and physical or wireless connectors are distributed within the device to provide an approximately even weight distribution.

Preferably the display is provided with a front sheet of transparent material, preferably PMMA (polymethyl methacrylate)-perspex ("plexiglass" or "lucite") which acts as a structural member of the device. In preferred embodiments the front display surface is flat and planar to the edges of the device, without a bezel. The device is preferably engineered so that a neutral axis (more precisely, a neutral plane or surface) of the device lies within the thickness of the device, in particular for the central display region. More preferably, however, the neutral surface lies within 500 μm, more preferably 300 μm, most preferably 200 μm of the layer of (active matrix) pixel driver circuitry. Preferably, the neutral surface lies within 1 mm, more preferably 500 μm, most preferably 300 μm of the front surface of the display structure behind the front panel, or within these distances of the front display surface (if, for example, the front panel is less than 1 mm thick).

In some preferred embodiments, as previously mentioned, the control electronics is located within the frame, and preferably the (electrophoretic) display has outside edges sufficiently within the edges of the device that the display can be coupled to the control electronics by a connector, such as a flexible film, which does not need to be folded back on itself. This assists in achieving overall device flexibility. In preferred embodiments such a flexible film comprises a tape carrier package (TCP), on which may be mounted one or more driver chips for the display (the control electronics comprising, for example, a microprocessor and associated memory, glue, and interface logic). Preferably the flexible film or TCP is not bent by more than 60, 45 or 15 degrees; most preferably, however, the flexible film or TCP is substantially planar. Thus a circuit board bearing the control electronics and the pixel driver circuitry may be in substantially the same plane (for example in planes not spaced apart by more than 5, 3, 2 or 1 mm). Preferably, the TCP and the circuit board is located within the frame area of the device.

The flexible film or TCP may be connected both electrically and mechanically to the display by conductive adhesive. Such adhesive is particularly prone to failure on flexing. Therefore in some preferred embodiments the flexible film or TCP, more particularly a connection between the film/TCP and the pixel driver circuitry is on or adjacent to a neutral surface of the display, for example within 500, 300, 200 or 100 μm of a neutral surface.

In preferred embodiments in the central region of the device (that is, away from the frame) the device has layered structure comprising the front sheet of transparent material, the (electrophoretic) display, the pixel driver circuitry and a moisture barrier. Preferably the moisture barrier below the pixel driver circuitry comprises a metal layer, for example a layer of aluminium foil, which provides an effective barrier with little thickness, contributing to the overall device flexibility. A further moisture barrier may be included between the display and the front sheet, but this should be transparent. Preferably some or all of the layers of the layered structure are joined by adhesive, preferably a peel-resistant adhesive, in particular without a through-hole fastener such as a bolt extending through the thickness of the hole structure. This allows a limited (if small) degree of sheer between the layers and hence contributes to stress reduction during limited flexion.

In some preferred embodiments the rear of the housing incorporates a flex-limiting and/or torsion-limiting structure. For example a flex-limiting structure may comprise a series of parallel grooves the edges of which, under compression, touch at their outer extremities, hence locking the structure in compression. A torsion limiting structure may similarly comprise parallel grooves, although running diagonally as compared with the edges of the device. In torsion, likewise, the upper edges of the grooves close and limit torsion by compression locking. In embodiments the frame may incorporate structures of either or both of these types.

In embodiments the frame comprises rib around the edge of the rear surface preferably, but not necessarily, extending entirely around the rear edge of the device. In embodiments this frame or rib may be formed by overmoulding or encapsulating the control circuitry; thus the frame may be of one-piece construction.

In a related aspect the invention provides an electronic document reading device having a picture frame configuration comprising a flat, thin display area stiffened by a surrounding frame.

Preferably the display has a thickness of less than 10, 8, 6, 4, 2 or 1 mm (apart from the frame). Preferably the frame has a width of less than 5, 4, 2 or 1 cm.

In preferred embodiments the frame incorporates (rigid) control electronics for the device. Preferably this control electronics is coupled to the flexible display by a flexible film such as a TCP. In embodiments the control electronics is located outside an area of the display so that this flexible film or TCP need not be folded back on itself, thus conferring greater flexibility.

In a further related aspect the invention provides an electronic document reading device comprising an electronic display with associated pixel driver circuitry attached to a transparent front panel, and wherein a neutral surface of said device lies within a front-to-back thickness of the device.

In preferred embodiments the (active matrix) pixel driver circuitry extends over a plane behind the display and is attached to the display by adhesive; preferably the display is attached by adhesive to the front panel. Preferably the neutral surface lies within 500, 400 or 300 µm of a plane of the pixel driver circuitry, for example within 1-200 µm of the plane of the pixel driver circuitry.

In a still further related aspect the invention provides an electronic document reading device comprising an electronic display and a housing, and wherein a rear surface of said housing includes one or both of a flex-limiting and a torsion-limiting structure to limit bending of edges of the device towards the rear.

Preferably one or both of the flex-limiting and torsion-limiting structure comprises a plurality of grooves.

BRIEF DESCRIPTION OF THE DRAWINGS

These and other aspects of the invention will now be further described by way of example only, with reference to the accompanying figures in which:

FIGS. 1a to 1c show, respectively, a front, display face view, a rear view, and a vertical cross-section view of an electronic document reading device according to an embodiment of the invention;

FIG. 2 shows a detailed vertical cross-section through a display portion of the device of FIG. 1;

DETAILED DESCRIPTION OF THE PREFERRED EMBODIMENT

Figure 3:
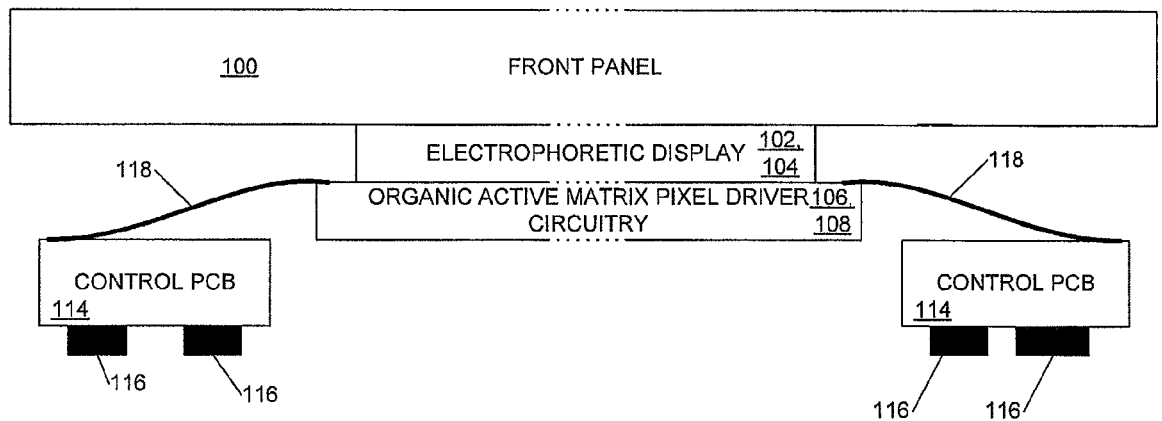
FIG. 3 shows a vertical cross-section illustrating a mechanical configuration of control electronics for the device of FIG. 1.

Referring to FIGS. 1a to 1c, these schematically illustrate an electronic document reading device 10 having a front display face 12 and a rear face 14 incorporating a frame 16 around the edge to stiffen the structure. As can be seen from FIG. 1c, in preferred embodiments the display surface 12 is substantially flat to the edges of the device and, in particular, lacks a display bezel. However in embodiments described later it will be seen that the electronic reflective bistable display (for example electrophoretic, LDC or other like displays) does not extend right to the edges of the display surface 12, and rigid control electronics are incorporated around the edges of the electronic display within the frame members 16, this approach reducing the overall thickness of the device and thus facilitating flex-tolerance, at the expense of making the overall area of the device slightly larger. This trading of thickness for lateral area also enables flexible tape carrier packages (TCPs) joining the electronic display to the control electronics to lie approximately flat within the device, again facilitating flexibility. Keeping the central region 17 of the device, between the frame members 16, thin also enhances flexibility as compared with a uniformly slightly thicker configuration.

Referring now to FIG. 2, this illustrates a vertical cross-section through a display region of the device between the frame members 16. The drawing is not to scale.

As can be seen, in preferred embodiments the device has a substantially transparent front panel 100, for example made of perspex, which acts as a structural member and, in particular, which locates the neutral surface 107 of the device within 1-200 µm of the active matrix pixel driver circuitry layer 106. The active matrix may comprise an array of organic or inorganic thin film transistors as disclosed, for example, in WO01/47045. Such a front panel is not necessary and sufficient physical stiffness could be provided, for example, by the substrate 108 optionally in combination with one or both of the moisture barriers 102, 110.

The illustrated example of the structure comprises a substrate 108, typically of plastic such as PET (polyethylene terephthalate) on which is fabricated a thin layer 106 of organic active matrix pixel driver circuitry. Attached over this, for example by adhesive, is a reflective bistable display (for example an electrophoretic display) 104. Alternative display media such as an organic LED display medium or liquid-crystal display medium may also be used. A moisture barrier 102 is provided over the electronic display 104, for example of polyethylene and/or Aclar™, a fluoropolymer (polychlorotifluoroethylene-PCTFE). A moisture barrier 110 is also preferably provided under substrate 108; since this moisture barrier does not need to be transparent preferably moisture barrier 110 incorporates a metallic moisture barrier such as a layer of aluminium foil. This allows the moisture barrier to be thinner, hence enhancing overall flexibility. Approximate example thicknesses for the layers are as follows: 100 µm for moisture barrier 110, 200 µm for substrate 108, 5-6 µm for active layer 106, 190 µm for display 104, and 200 µm for moisture barrier 102. The set of layers 102-110 form an encapsulated electronic display 112; preferably this is bonded, for example by adhesive, to a transparent display panel 100. The front panel 100 may have a thickness in the range 0.5-2 mm, for example approximately 1 mm.

If the electronic document reading device had a uniform thickness, i.e., it was stiffened behind the entire display area to improve its robustness as opposed to just being stiffenend in the frame around the display, the neutral surface of the device would end up being located more than 1-2 mm below the active pixel drive circuitry and the TCP connectors, thus potentially significantly increasing a strain in particular on the active electronics when the device is flexed. Furthermore, stiffening across the entire area of the display would lead to an undesirable increase in the weight of the electronic reading device.

The location of the neutral surface depends upon the stiffness of the display layers 112—which may be measured experimentally—and of the front panel 100. The location of the neutral surface may be determined by a straightforward calculation, in a manner well known to those skilled in the art; the location of the neutral surface may be adjusted by, inter alia, adjusting the thickness of front panel 100. Preferably the neutral surface 107 is located within the active matrix layer 106 or within 1-200 µM of this. manner well known to those skilled in the art; the location of the neutral surface may be adjusted by, inter alia, adjusting the thickness of front panel 100. Preferably the neutral surface is located within the active matrix layer 106 or within 1-200 µm of this.

Surprisingly it has been found that the presence of the front panel 100 has little effect on the overall visual appearance of the display, in particular the contrast ratio. It is speculated that this is because although whites become slightly greyer, black becomes slightly blacker.

Referring now to FIG. 3, this shows a simplified vertical cross-section of the device illustrating details of connections between the display 104 and the control circuitry of the device. It is also helpful to refer to FIG. 4 which shows a view from above.

Figure 4:
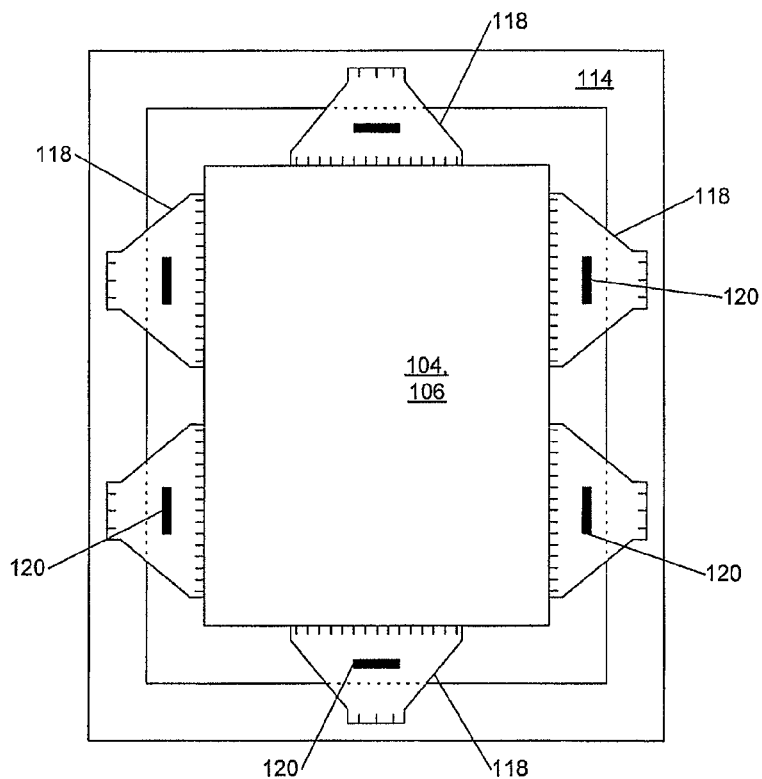
FIG. 4 shows a view from above of an internal configuration of the device of FIG. 1 illustrating the location of control and driver electronics.
Figure 10:
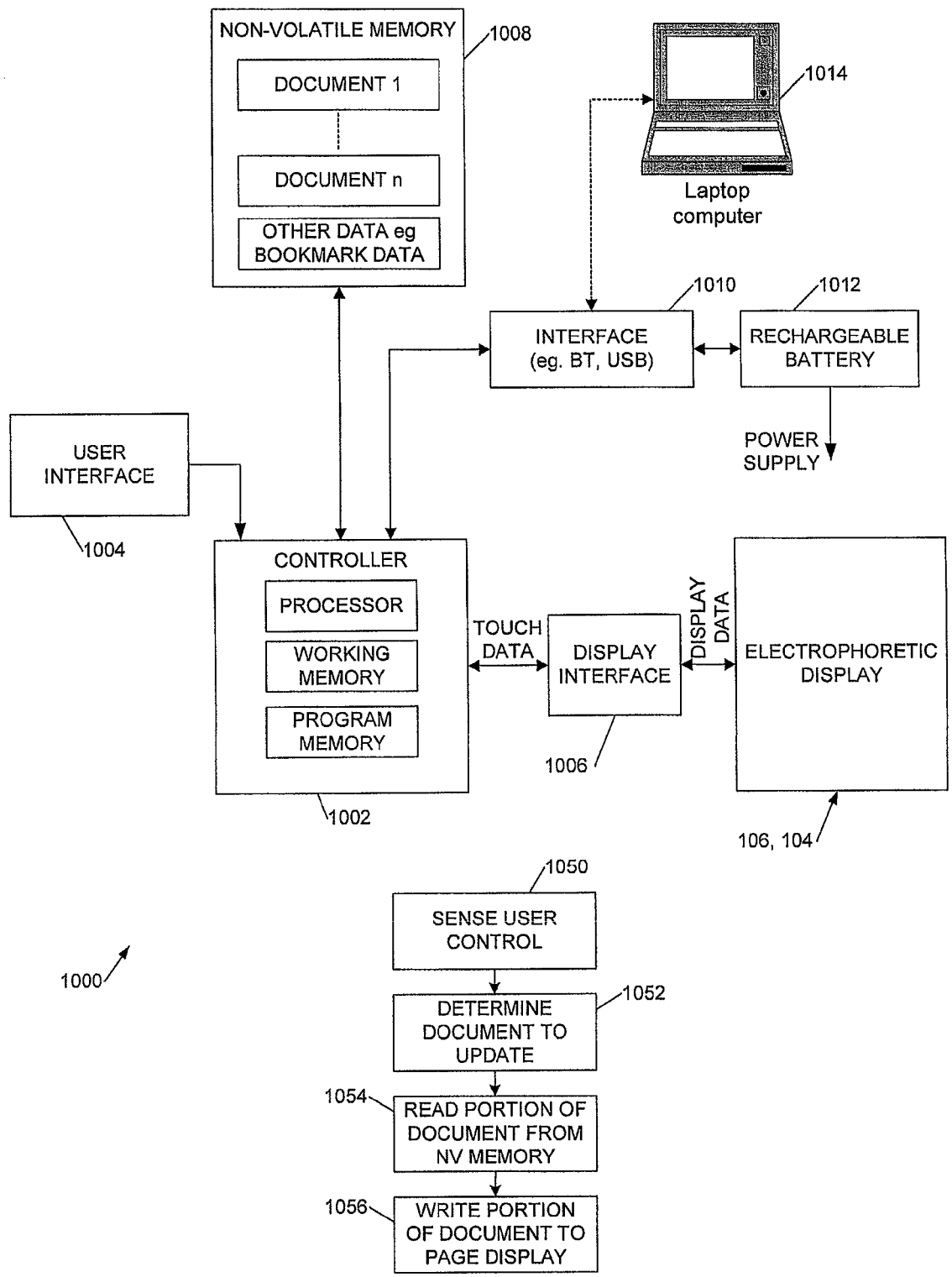
FIG. 10 shows a block diagram of control electronics for an electronic document reader according to an embodiment of the invention.

In preferred embodiments a printed circuit board 114 is incorporated into the frame 16 of the display device, either as a continuous frame (as illustrated) or as separate PCBs. This PCB carries conventional silicon electronics 116 typically comprising a microprocessor, memory and associated glue logic, for example as shown in FIG. 10 later. The PCB 114 is connected to the active matrix driver circuitry 106 by a plurality of flexible links 118 such as tape carrier packages (TCPs). As illustrated in FIG. 4, preferably the electronics are distributed around the display area to provide an approximately even weight distribution. Also as illustrated in FIG. 4 a TCP 118 may incorporate a driver integrated circuit 120 to interface between the active matrix circuitry 106 and the control electronics. As schematically illustrated in FIG. 4, a flexible link 118 may provide a large number of high-density connections to the active matrix circuitry 106 and a smaller number of lower density connections to the control PCB 114.

As illustrated in FIG. 3, preferably the control PCB 114 is at approximately the same level as the active matrix driver circuitry 106 so that flexible link 118 is not substantially bent (it will be appreciated that FIG. 3 is not to scale). The control PCB may be located slightly below the active matrix circuitry 106 and hence may overlap laterally with this circuitry. Alternatively the upper surface of the control PCB 114 may substantially coincide with a level of the upper surface of the active matrix circuitry 106. In both these and similar configurations, however, it will be appreciated that the flexible link 118 is not substantially bent as would be the case if, for example, the control PCB 114 was located in the central region of the device under the active matrix circuitry 106—such a bend is undesirable as it would reduce the flexibility of link 118. (It will be appreciated that, in embodiments, control PCB 114 is double-sided).

Connections between the active matrix circuitry 106 and the flexible link 118 may be made conductive adhesive, which is particularly vulnerable to cracking. This therefore provides a further advantage of locating the neutral surface in the vicinity of the active matrix circuitry 106 and hence in the vicinity of such an adhesive joint. The same considerations may apply to the joint between link 118 and control PCB 114 (although this electrical connection may be soldered).

Figure 5:
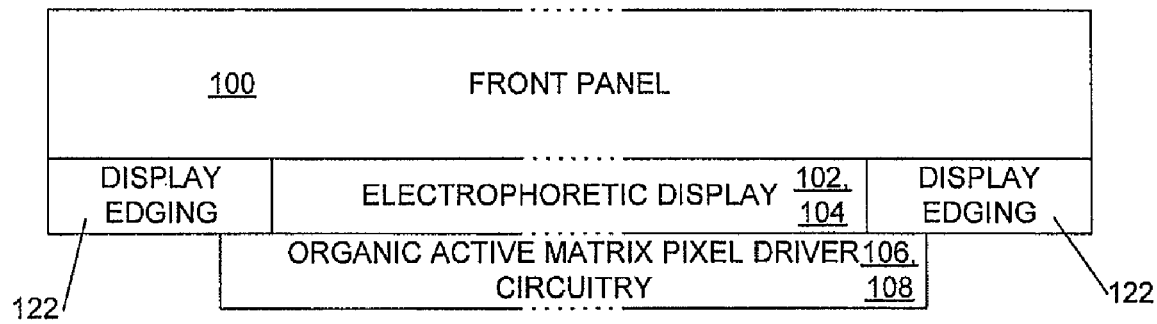
FIG. 5 illustrates display edging for the device of FIG. 1.
Figure 6:
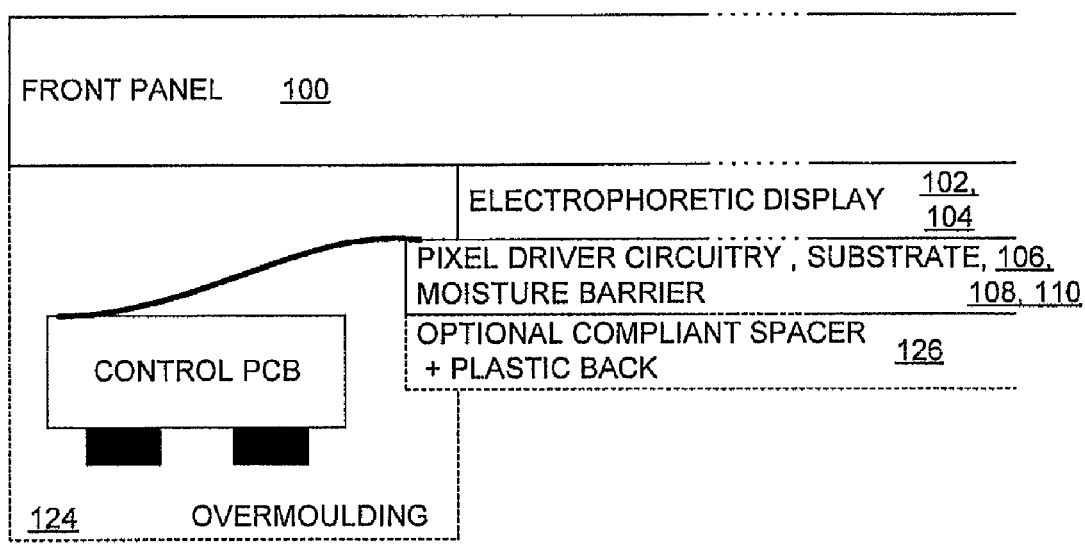
FIG. 6 illustrates an example of a frame moulding for a device according to an embodiment of the invention.
Figure 7A:
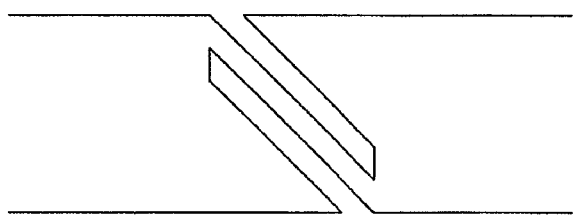
FIG. 7a to 7e show, respectively, a portion-limiting structure, surface and vertical cross-sectional views of a flex-limiting structure, a view of a portion of a frame of a device according to an embodiment of the invention incorporating both torsion- and flex-limiting structures, an example of a rear surface of a document reader without a frame incorporating flex-limiting structures, and a schematic illustration of the operation of a flex-limiting structure in flex-compression.
Figure 7B:
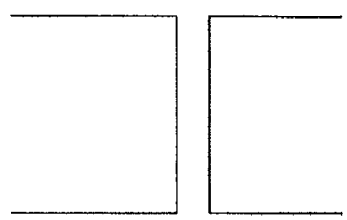
Figure 7C:
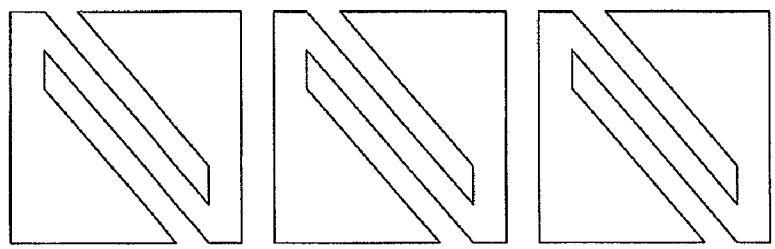
Figure 7D:
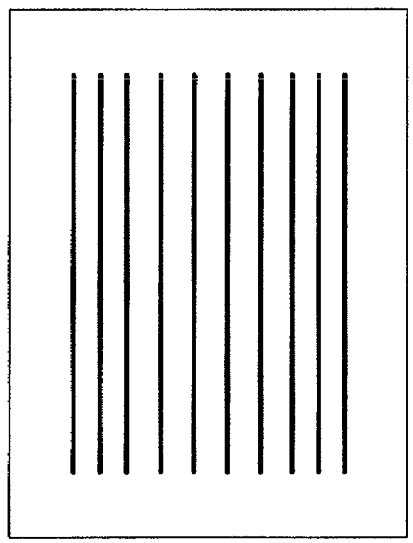
Figure 7E:

Referring to FIG. 5, this schematically illustrates a display edging arrangement (the illustration is simplified, and not to scale). As shown the display edging 122 is provided around the perimeter of electrophoretic display 104. This may comprise a simple border which may be, for example, sprayed onto the front panel 100. However in other embodiments to provide a uniform appearance to a user display edging 112 may comprise electrophoretic display material such as an additional, undriven sheet of electrophoretic display or an undriven lateral extension of electrophoretic display 104.

The frame member 16 of FIG. 1 may simply comprise a moulded plastic rib attached to the front panel 100. However to provide additional environment protection, in particular from moisture, the control electronics may be encapsulated, for example using polyurethane to form an overmoulding 124. Optionally a plastic back 126 may be provided for the device, although this is not essential. If such a back is included optionally a compliant spacer may be provided between the plastic back and the display and front panel combination for example so as not to substantially displace the position of the neutral surface. Preferably the moisture barriers 102, 110 are attached to the other layers of the display by adhesive; preferably the front panel 100 is also attached by adhesive. This is preferable to, for example, a bolt (which could be hidden behind the frame) since this allows a small degree of lateral movement between the various layers of the display when flexed.

Figure 8:
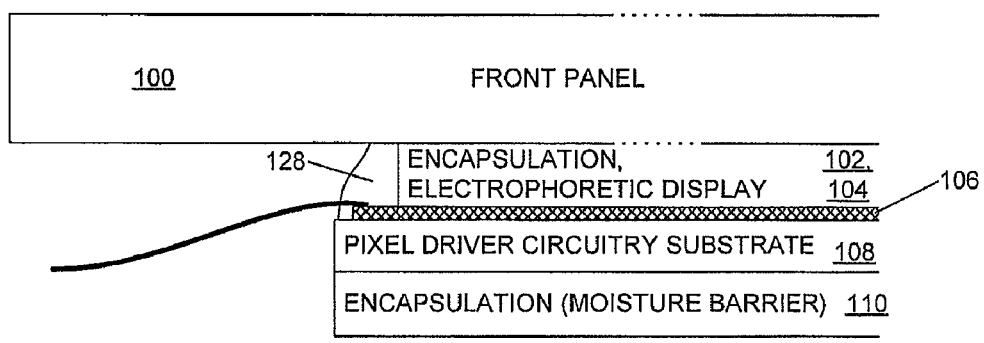
FIG. 8 shows details of encapsulation of a display for an electronic document reader.

FIG. 8 shows, schematically, further details of encapsulation in an example embodiment of the device. In the illustrated example an encapsulation bead 128 is provided over the edge of the electrophoretic display 104 and active matrix circuitry 106 to help protect against ingress of moisture, air and the like.

Referring to FIG. 7, this illustrates examples of various flex-limiting and torsion-limiting structures. The general principle is illustrated in FIG. 7e—when flexed the top, outer edges of a groove will contact and limit further flexion because of the compression forces which are generated. An unflexed groove structure is shown in FIG. 7b; the structure of FIG. 7a operates in a similar manner, but with a diagonal link to limit flex-torsion. Combination of the structures of FIGS. 7a and 7b, as shown in FIG. 7c, can be formed on the back of a frame member 16 to provide a combination of flex and torsion limiting. In another example of an electronic document reading device without frame members a plastic rear surface of the device is provided with a series of grooves as shown in FIG. 7d, as illustrated limiting flexion about a vertical axis. A similar arrangement may be employed to limit flexion about a horizontal axis and/or a combination of horizontal and vertical grooves (squares or rectangles) may be employed to limit flexion in two directions. The configuration of the grooves of FIG. 7d have the added advantage that they provide, to a user, a tactile sensation which approximates to the feel of the edges of the pages of a closed book.

Figure 9A:
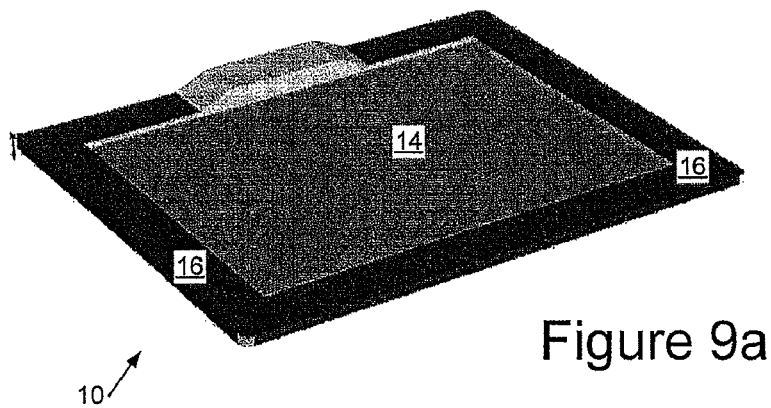
FIGS. 9a and 9b show, respectively, a three-dimensional rear view and a perspective front view of an electronic document reader according to an embodiment of the invention.
Figure 9B:
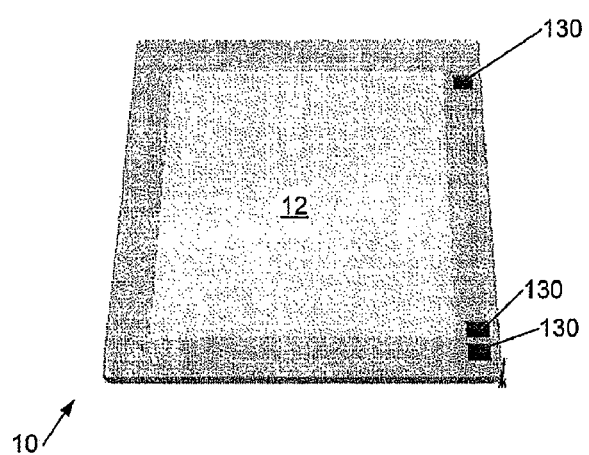

FIG. 9a shows a perspective view of the electronic document reader 10 from the rear, illustrating the frame and also a raised portion incorporating, in embodiments a USB (universal serial bus) or similar connector (this may also serve as a handle). FIG. 9b shows the device of FIG. 9a from the front, illustrating the border around the area of the electronic display 104. The device as illustrated in FIG. 9b also includes a number of user controls 130 for selecting documents and/or pages, turning pages forward and back and the like. However in other embodiments the display may be touch sensitive, for example as described in our co-pending international patent application PCT/GB2006/050220 hereby incorporated by reference in its entirety. The aforementioned patent application describes an arrangement in which a touch-screen component is positioned below the display, but which is nonetheless operable from the front, display surface, in particular by laminating the display medium and display backplane over a resistive touch-screen (using a pressure sensitive adhesive). However the skilled person will appreciate that other forms of touch-screen technology may additionally or alternatively be employed.

As mentioned above, in preferred embodiments the display medium is a reflective display medium, in particular an electrophoretic display medium and the backplane comprises a flexible substrate such as PET or PEN (polyethylene naphthalene). Preferably the backplane is fabricated using solution-based transistors preferably patterned by techniques such as direct-write printing, laser ablation or photolithography. Further details can be found in the applicant's earlier patent applications, including, in particular, WO 01/47045, WO 2004/070466, WO 01/47043, WO 2006/059162, WO 2006/056808, WO 2006/061658, WO 2006/106365 and PCT/GB2006/050265, all hereby incorporated by reference in their entirety.

Referring now to FIG. 10, this shows example control circuitry 1000 suitable for the above-described electronic document reader 10. The control circuitry comprises a controller 1002 including a processor, working memory and programme memory, coupled to a user interface 1004 for example for controls 130. The controller is also coupled to the active matrix driver circuitry 106 and electrophoretic display 104 by a display interface 1006 for example provided by integrated circuits 120. In this way controller 1002 is able to send electronic document data to the display 104 and, optionally, to receive touch-sense data from the display. The control electronics also includes non-volatile memory 1008, for example Flash memory for storing data for one or more documents for display and, optionally, other data such as user bookmark locations and the like. An external interface 1010 is provided for interfacing with a computer such as laptop 1014 to receive document data and, optionally, to provide data such as user bookmark data. The interface 1010 may comprise a wired, for example USB, and/or wireless, for example Bluetooth™ interface and, optionally, an inductive connection to receive power. The latter feature enables embodiments of the device to entirely dispense with physical electrical connections and hence facilitates inter alia a simpler physical construction and improved device aesthetics. A rechargeable battery 1012 or other rechargeable power source is connected to interface 1010 for recharging, and provides a power supply to the control electronics and display.

The skilled person will appreciate that processor control code for a wide range of functions may be stored in the programme memory. By way of example a simple document display procedure may comprise, in operation, sensing a user control 1050, determining which document to update 1052, reading a portion of the relevant document from the non-volatile memory 1054, and writing the read portion of the document to the page display 1056.

The skilled reader would also understand that the display may comprise a reflective bistable display, which may include (by way of example only) electrophoretic displays, LCD displays and other like reflective bistable displays.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A portable electronic document reading device, said device comprising a display coupled to a layer of pixel driver circuitry, wherein said device has a physical configuration comprising a planar display surface and a rear surface, said rear surface having a frame around its outer perimeter to stiffen said device, the frame defining a central region of said device, wherein said device has a relatively reduced thickness in said central region compared with a thickness of said frame, wherein said display surface comprises a sheet of transparent material behind which said display is attached, wherein said transparent sheet mechanically supports said display in a planar configuration, and wherein said pixel 3driver circuitry comprises organic pixel driver circuitry on a plastic substrate; and said device further comprising a tape carrier package (TCP) on at least two edges of said display, and one or more circuit boards comprising control electronics for said device, wherein said one or more circuit boards are located laterally outside at least two edges of said display, and wherein a said TCP is not bent by more than 60 degrees.

2. A device as claimed in claim 1 wherein said transparent material comprises perspex.

3. A device as claimed in claim 1 wherein in said central region of said device has a neutral surface lying within the thickness of the device.

4. A device as claimed in claim 3 wherein in said central region of said device said neutral surface is within 500 μm of said layer of pixel driver circuitry.

5. A device as claimed in claim 4 wherein in said central region of said device said neutral surface is within 300 μm of said layer of pixel driver circuitry.

6. A device as claimed in claim 5 wherein in said central region of said device said neutral surface is within 200 μm of said layer of pixel driver circuitry.

7. A device as claimed in claim 3 wherein electrical connections of said TCP to said display are on or adjacent to said neutral surface.

8. A device as claimed in claim 1 wherein in said central region of said device said display has a layered structure comprising said sheet of transparent material, said display, said layer of pixel driver circuitry and at least a moisture barrier layer behind said layer of pixel driver circuitry.

9. A device as claimed in claim 8 wherein said moisture barrier layer includes a layer of metal.

10. A device as claimed in claim 8 wherein layers of said layered structure are joined by adhesive without a through-hole fastener.

11. A device as claimed in claim 1 wherein said display, said TCPs and said one or more circuit boards are all in substantially the same plane.

12. A device as claimed in claim 1 wherein said one or more circuit boards are located in said frame.

13. A device as claimed in claim 1, wherein said one or more circuit boards provide a circuit board outside each edge of said display.

14. A device as claimed in claim 1 wherein said frame incorporates a flex-limiting structure.

15. A device as claimed in claim 1 wherein said frame includes a torsion-limiting structure.

16. A device as claimed in claim 1 wherein said frame comprises a rib on said rear surface.

17. A device as claimed in claim 1 wherein said frame comprises an overmoulding.

18. A device as claimed in claim 1 wherein said display comprises an electrophoretic display.

\* \* \* \* \*

UNITED STATES PATENT AND TRADEMARK OFFICE
CERTIFICATE OF CORRECTION

| | |
|---|---|
| PATENT NO. | : 8,203,546 B2 |
| APPLICATION NO. | : 12/027181 |
| DATED | : June 19, 2012 |
| INVENTOR(S) | : Ben Watson |

It is certified that error appears in the above-identified patent and that said Letters Patent is hereby corrected as shown below:

Column 8, line 48, Claim 1, delete "3driver" and insert -- driver --, therefor.

Signed and Sealed this
Twenty-eighth Day of August, 2012

David J. Kappos
*Director of the United States Patent and Trademark Office*